United States Patent Office 2,889,208
Patented June 2, 1959

---

2,889,208

WELL LOGGING PROCESS

Gerould H. Smith, Santa Ana, Calif., assignor to Union Oil Company of California, Los Angeles, Calif., a corporation of California No Drawing. Application October 8, 1956
Serial No. 614,351

11 Claims. (Cl. 23—230)

This invention relates to the logging of well bores to determine specific characteristics of the strata penetrated thereby, and particularly relates to the logging of well bores by analysis of samples of the penetrated strata to determine the amount and type of argillaceous materials contained therein.

In the rotary drilling of a well bore into the earth a long drill pipe or drill stem is extended downwardly through a rotary table, by means of which the drill pipe is turned, and through the borehole at the end of which a drill bit is pressed against the working face of the bore. In order to cool and lubricate the bit a drilling fluid is pumped downwardly through the drill stem, through the bit and across the working face, and upwardly through the space surrounding the drill bit in the borehole. In these bores the hydrostatic pressure of this fluid becomes rather high and at least a small amount of the liquid portion of the drilling fluid is forced by this hydrostatic pressure to flow as a filtrate into permeable underground strata penetrated by the bore. Since most permeable strata underground are saturated with an indigenous interstitial fluid, the filtrate from the drilling fluid displaces at least part of the interstitial liquid through the strata away from the well bore. The filter loss, or the amount of drilling fluid which invades the strata, should be kept at a minimum because of several disadvantageous effects which the filtrate has on the formation. In the case of an aqueous filtrate, gelation and swelling of certain argillaceous constituents found in many permeable strata result, thereby decreasing the fluid permeability of the strata, and this in turn results in a relatively low production rate from the bore. In subsequent electric well logging, the interpretation of the data obtained is based upon an estimated resistivity of the invaded formation. Any drilling fluid filtrate invasion displaces the indigenous fluids and changes the original resistivity to some unknown new value. This is frequently assumed to be the resistivity of the invasion fluid where filtration loss has progressed to a substantial degree.

It has been found that where the permeable strata penetrated by the well bore contain argillaceous materials, and this is typical of the permeable formations in California oil fields and some others, a fresh water filtrate from the drilling fluid which is assumed to exist in the formation after drilling of the well actually becomes salty due to the fact that certain of the clays liberate salt into the new invasion fluid. In so doing the fluid present in the permeable strata is neither as fresh as the original invasion fluid nor necessarily as salty as the original interstitial water. Furthermore, the fresh filtrate can damage the formation through a permeability decrease caused by gelation and swelling of the argillaceous materials.

The present invention is directed to an improved process which successfully overcomes these problems.

It is therefore an object of this invention to provide an improved method for electric well bore logging.

It is a more specific object of this invention to analyze drill bit cuttings, side wall samples, or core samples taken from a well bore to determine the presence of clay constituents therein in order to permit a more accurate estimation of fluid resistivity.

It is a more specific object of this invention to determine the presence of base exchange clays in samples of the various permeable strata penetrated by a well bore in order to estimate more accurately the degree of salinity, and therefore the resistivity, of the liquids present in such permeable strata after drilling and prior to conducting an electric logging operation.

Other objects and advantages of the present invention will become more apparent to those skilled in the art as the description thereof proceeds.

Briefly the present invention comprises a method for well bore logging which consists of the analysis of samples taken from the formations penetrated by the well bore to determine the presence of argillaceous materials in such formations. The analysis may be made of drill cuttings separated on a vibrating screen through which the circulating drilling fluid passes, on side wall samples cut from the walls of the borehole, on core samples taken during drilling, or on samples obtained from the well bore in any other way.

It is not every argillaceous material found in such permeable strata that adversely affects data to be obtained from an electric log, but it is found that primarily those clays which exhibit base exchange properties do so adversely affect the data. Clays have been found to associate with salt when they are in contact with saline solutions. This salt is released when the clay is contacted with a more dilute saline solution, or even pure water, and this increases the conductivity of the more dilute solution. In the drilling of well bores through permeable strata containing saline solutions in contact with argillaceous materials, a drilling fluid filtrate having a lower salinity than that of the interstitial water will become saltier as it invades the saline formation containing such clays, even though the normal interstitial saline water is flushed out of the invaded permeable zone by the filtrate.

To those skilled in the art of running and interpreting electric logs of well bores, it is clear that this leads to considerable error in the calculations involved in log interpretation because necessarily the calculations relating to data obtained adjacent permeable strata which contain base exchange clays are based on an incorrect value for the resistivity of the drilling fluid filtrate in the invaded permeable zone. Knowledge of both the resistivity of the formation waters and the type of clay in the invaded formation are necessary for accurate evaluation of the true resistivity of the filtrate in the invaded zone.

For example, a region of high conductivity or low resistivity indicated in an electric log can be indicative of either a very permeable and porous formation containing extensive quantities of relatively fresh drilling fluid filtrate, or a relatively tight formation containing base exchange clays and undisplaced saline waters originally present in the stratum. The present invention permits the distinction between these two types of formations.

It has now been found that a measure of the base exchange clays present in permeable formations can be obtained by determination of the amount of a non-ionic surfactant which is sorbed by the permeable material. It has been found that silica and quartz, feldspar, muscovite, kaolinite, and other relatively inert constituents of the normal underground formations penetrated by boreholes sorb substantially none of the non-ionic surfactants from an aqueous solution thereof. These materials also represent those which do not effect the resistivity of liquids present in or passing through such permeable formations. For example, these materials will sorb less than 0.02 grams of the non-ionic surfactant per gram from an aqueous solution of the surfactant, the solution concentrations ranging from about 10 p.p.m. to about 175,000 p.p.m.

In distinction to the performance of these materials insofar as sorption is concerned, it has now been found that the argillaceous materials which exhibit base exchange properties such as montmorillonite sorb up to about 0.70 gram of the surfactant per gram of material, from a solution of the surfactant in the same concentration range. Such clays include calcium montmorillonite, sodium montmorillonite, attapulgite, illite, and the like.

The non-ionic surfactants suitable for use in the present invention are of the ester type having the general formula

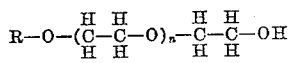

in which $n$ is an integral number ranging from 3 to 30 and R is an organic radical selected from the group consisting of alkylated aryl (alkaryl), fatty acid and mixed acid residues, and the partial esters of hepatol anhydride and a fatty acid.

Examples of alkyl-aryl radicals include methyl phenyl, ethyl phenyl, isopropyl phenyl, iso-octyl phenyl, dodecyl phenyl, cetyl phenyl, eicosyl phenyl, and the like.

Examples of the fatty acids are capric, lauric, myristic, palmitic, stearic, oleic, erucic, behenic, and the like. The mixed acids include these same acids and such as abietic acid, tall oil acids, and the like.

Examples of the partial esters are those prepared from the aforementioned fatty acids and a hepatol anhydride or dehydrated hexitol such as sorbitol, mannitol, dulcitol, iditol, and the like.

The preferred non-ionic surfactant employed in the present invention is that in which R is an iso-octyl phenyl radical and in which $n$ is about 14.

The procedure for analysis of the underground samples according to the present invention involves grinding the sample obtained from the subsurface to a fine powder. The powder or a fraction thereof of known weight is then dispersed in a known amount of an aqueous solution of the surfactant having a known relatively low concentration. The powder and the solution are thoroughly shaken together to enhance clay-surfactant contact.

The absence or substantial absence of base exchange clays in the sample is indicated by the presence on the liquid layer of head of foam which is substantially equal to that obtained by shaking an equal quantity of the surfactant solution in an identical vessel with an equal weight of an inert solid, e.g. powdered silica or quartz, feldspar, muscovite, kaolinite, or the like.

The presence of base exchange clays in the sample is indicated by the absence of foam or presence of a substantially smaller head of foam. This results from the substantially quantitative sorption of the surfactant from the solution by base exchange clays preventing the foam formation. Over 97% of the surfactant is thus removed from a solution containing insufficient surfactant to saturate these clays and it is thus unable to generate a stable foam.

An example of the preferred procedure of this invention involves dividing a powdered sample into a plurality of fractions, each fraction weighing about 10 grams, and the contacting of the several fractions with several standard solutions containing 100, 1000, and 10,000 parts of surfactant per million of water or other suitable volume and concentration ranges so that unsorbed surfactant is detected only in the contacts having the higher surfactant to sample weight ratios. With a 10.00 gram sample and 10.0 ml. of the 100 p.p.m. solution, no foam after shaking indicates the presence of clays such as montmorillonite in excess of 0.017% by weight. Foam indicates no clay, or clay less than 0.017%. With 10.0 ml. of the 1000 p.p.m. solution, foam indicates clay less than 0.17% while no foam indicates clay in excess of 0.17%. With 10.0 ml. of the 10,000 p.p.m. solution, foam indicates clay less than 1.7% while no foam indicates clay present in excess of 1.7%. A series of such tests indicating unsorbed surfactant in some tests only serves to bracket the actual clay concentration in the sample. By using solutions of different dilution or proportionately more solution, clay concentrations as low as 10 p.p.m. (0.001% by weight) can be determined.

In a slight modification the sample may be titrated with a standard surfactant solution to the appearance of a stable foam indicating saturation of all base exchange clay present. From the volume of standard solution required and the sample weight, the clay concentration is determined.

In another modification, which may serve if desired as a check determination following the preferred procedure above, a sample is shaken thoroughly with a known volume of surfactant solution sufficient to form a stable foam. The mixture is then separated into its liquid and solid phases as by centrifugation, filtration, decantation, and the like. The solids phase is washed and added to the separated liquid phase. The liquid phase is then analyzed to determine the quantity of unsorbed surfactant. On the basis of a simple material balance the quantity of sorbed surfactant per unit weight of sample is determined as a measure of the quantity of base exchange clays present therein. With the preferred type of surfactants containing the alkyl-aryl group, the ultraviolet spectrophotometer is probably the most convenient means for determining the quantity of unsorbed surfactant since it gives accurate analysis of these materials in water solutions to less than 10 parts per million and exhibits a strong absorption maxima at 2760 A. and 2230A.

The relative amounts of ground sample and of surfactant solution employed in the above described check determination is preferably such that a relatively large excess of surfactant is used, that is, an amount more than sufficient to saturate the base exchange clays present. With the specific base exchange clays mentioned above it is preferable to employ on the order of 200% to 600% of the surfactant necessary to saturate the exchange clays. The approximate amount of base exchange clays can be determined in a preliminary analysis using standard solutions as described above. The residual aqueous phase contains a substantial excess amount of unsorbed surfactant and is therefore easy to analyze to determine the amount of sorbed surfactant and the amount of base exchange clay.

The above procedure is conducted on samples taken from all or the principal permeable strata penetrated by the formation to determine a base exchange clay gradient log at least through the principal permeable interval. In those regions where little or no clay is found, invaded fluid or filtrate from the drilling mud in the formation will have a resistivity substantially identical to that of the drilling fluid filtrate. In those intervals where substantial clay of the base exchange type is found, the resistivity of the invaded fluid present will not be the same as that of the filtrate from the drilling mud, but will be lower due to liberation of salt from these clays into a filtrate having lower salinity than the interstitial brine. The estimation of the resistivity is made knowing the resistivity values for the interstitial brine and the filtrate, and the base exchange clay content.

A particular embodiment of the present invention has been hereinabove described in considerable detail by way of example. It should be understood that various other modifications and adaptations thereof may be made by those skilled in this particular art without departing from

I claim:

1. A process for determining the presence of argillaceous materials having base exchange properties in heterogeneous solid materials which comprises contacting a sample of said solid material with an aqueous solution of a non-ionic polymeric surfactant having a structural formula

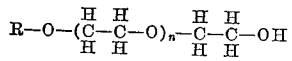

wherein $n$ is an integral number ranging from about 3 to about 20 and R is an organic radical selected from the group consisting of alkyl-aryl, fatty acid residues, and partial esters of hepatol anhydride and a fatty acid, whereby said surfactant is sorbed from the solution by any of said argillaceous materials present having base exchange properties, and detecting the absence in said solution of unsorbed surfactant.

2. A process according to claim 1 wherein each of a plurality of samples of said solid material is contacted with a volume of the surfactant solution providing a series of contacts in which the weight ratio of surfactant to sample is different, the presence of unsorbed surfactant being detected by the presence of a supernatant foam on the solution after agitation thereof with said sample only in those contacts having the higher ratios.

3. A process according to claim 2 wherein the absence of said argillaceous materials is determined by the presence of said foam in those contacts having the lowest surfactant to sample weight ratios.

4. A process according to claim 1 wherein R is isooctyl phenyl and $n$ is about 14.

5. A process according to claim 1 in combination with the step of grinding said sample to a fine powder prior to contacting it with said solution.

6. A process according to claim 1 in combination with the step of repeating the sample contacting and surfactant detecting step on samples taken from the borehole over a depth interval to provide a log of base exchange argillaceous materials throughout the interval.

7. A process for well bore logging to determine the presence of argillaceous materials having base exchange properties in the various strata penetrated by a well bore which comprises taking a series of samples from the various strata, reducing each sample to a powder, contacting each sample with an aqueous solution containing a known amount of a non-ionic polymeric surfactant having the structural formula

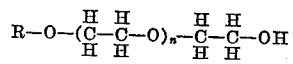

wherein $n$ is an integral number between about 3 and about 20 and R is an organic radical selected from the group consisting of alkaryl, fatty acid residues, and partial esters of hepatol anhydride and a fatty acid, whereby any argillaceous materials having base exchange properties sorb said surfactant from said solution, and detecting the presence or absence of unsorbed surfactant in the solution after contact with each of said samples to determine respectively the absence or presence and concentration of said materials therein.

8. A process according to claim 7 wherein each of said samples in powdered form is divided into a plurality of fractions, the fractions are contacted with known volumes of standard solutions of known concentration providing a series of contacts in which the weight ratios of surfactant to sample changes throughout a range so that unsorbed surfactant is detected only in those contacts having the higher ratios, and calculating the clay concentration in the sample from the sample weight and the surfactant quantity used to just saturate the argillaceous base exchange materials therein.

9. A process according to claim 7 wherein detection of unsorbed surfactant is by appearance of a stable foam on the solution after thorough agitation with said sample.

10. A process according to claim 7 wherein said sample is contacted with said solution by titrating the power with surfactant solution of known concentration until said argillaceous materials with base exchange properties are just saturated therewith as indicated by an appearance of stable foam on the slurry of sample in said surfactant solution after thorough agitation.

11. A process according to claim 7 wherein said sample is contacted with a quantity of surfactant in excess of that required to saturate by sorption on said argillaceous materials, in combination with the step of measuring the amount of unsorbed surfactant in the solution to determine the amount sorbed and the amount of said argillaceous materials in said sample.

References Cited in the file of this patent

UNITED STATES PATENTS 2,691,109    Bernard _____ Oct. 5, 1954

OTHER REFERENCES

Berkman et al.: "Emulsions and Foams," 1941, pages 112–148.

UNITED STATES PATENT OFFICE
CERTIFICATE OF CORRECTION

Patent No. 2,889,208 June 2, 1959

Gerould H. Smith

It is hereby certified that error appears in the printed specification of the above numbered patent requiring correction and that the said Letters Patent should read as corrected below.

Column 2, line 60, for "distinrtion" read -- distinction --; column 3, lines 23 and 33, for "hepatol" read -- hexatol --; column 4, line 11, for "10 p,p,m." read -- 10 p.p.m. --; column 5, line 16, and column 6, line 7, for "hepatol" read -- hexatol --; same column 6, line 29, for "power" read -- powder --.

Signed and sealed this 13th day of October 1959.

(SEAL)
Attest:

KARL H. AXLINE
Attesting Officer

ROBERT C. WATSON
Commissioner of Patents